Jan. 9, 1940. M. F. HILL Re. 21,316
TOOTH CURVE FOR ROTORS AND GEARS
Original Filed Aug. 24, 1928 2 Sheets-Sheet 1
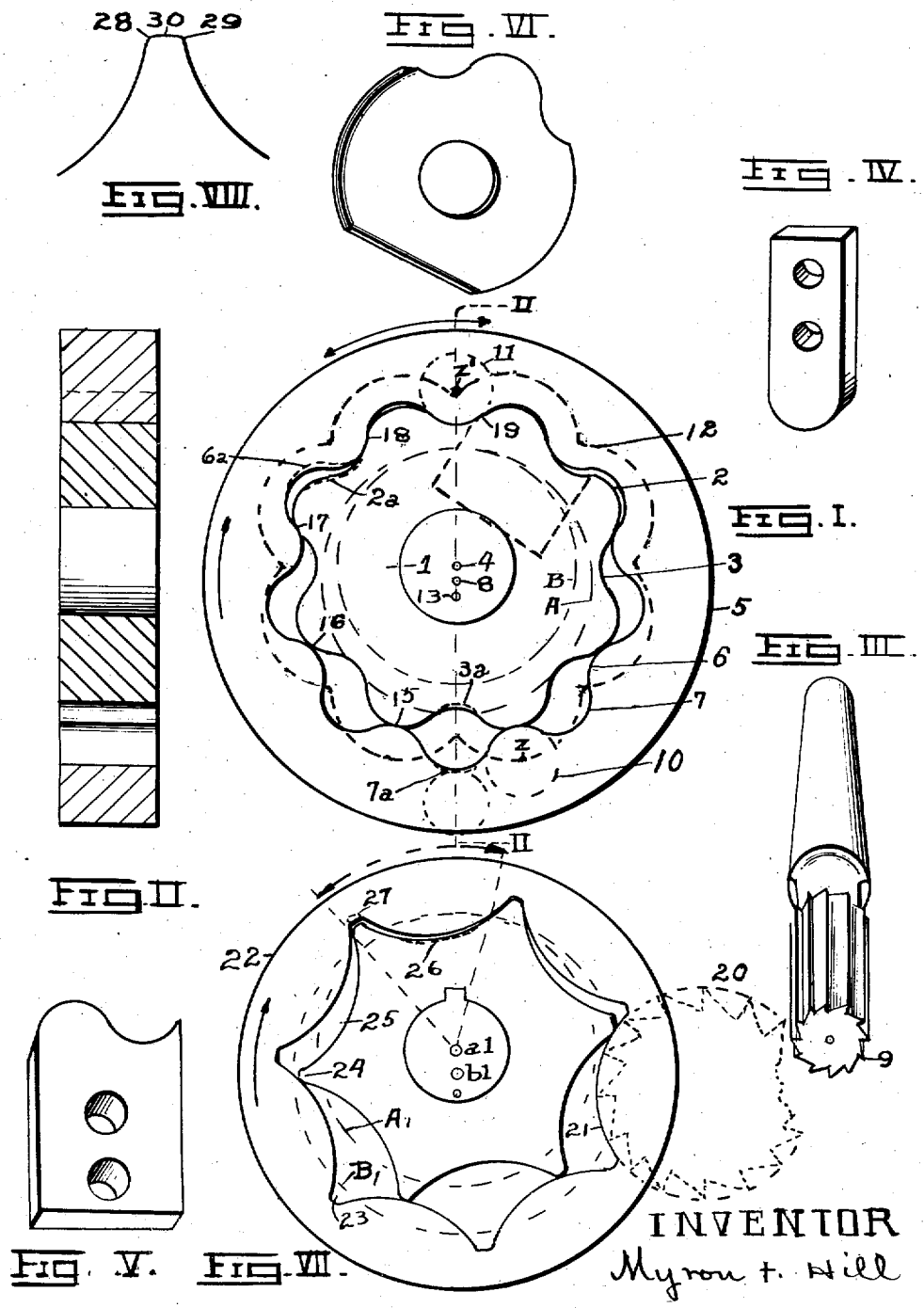
INVENTOR
Myron F. Hill TOOTH CURVE FOR ROTORS AND GEARS
Original Filed Aug. 24, 1928 2 Sheets-Sheet 2
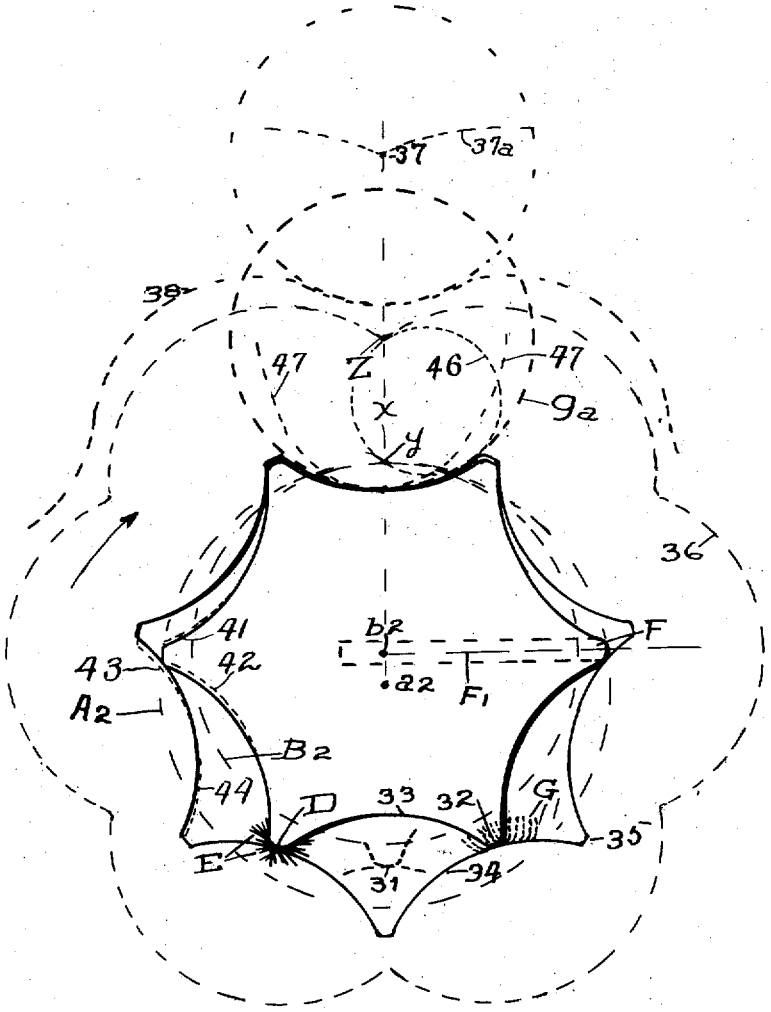
FIG. IX.
INVENTOR
Myron F. Hill Reissued Jan. 9, 1940

Re. 21,316

UNITED STATES PATENT OFFICE 21,316

TOOTH CURVE FOR ROTORS AND GEARS

Myron F. Hill, Westport, Conn., assignor, by mesne assignments, to Francis A. Hill, 2nd, Essex Falls, N. Y., and said Myron F. Hill Original No. 2,031,888, dated February 25, 1936, Serial No. 511,626, January 27, 1931, which is a division of Serial No. 301,880, August 24, 1928. Renewed October 5, 1932. Application for reissue February 24, 1938, Serial No. 192,398

30 Claims. (Cl. 74—462)

This case is a division of my Patent No. 1,833,993 and contains in addition to the matter divided out of that patent, additional matter, the subject of further invention. It is useful in pumps, compressors, engines and toothed gears.

My invention relates primarily to internal rotors, that is, two rotors one inside the other; and having tooth divisions, one preferably having one less tooth division than the other; the teeth of each making certain continuous contact with the contours of the other during rotation at steady angular speeds.

Efforts of others in the past to construct such internal rotors or gears capable of running smoothly and efficiently in a pump or motor have failed thru a geometrical fault in their tooth curves which prevented a tooth form of one rotor from engaging a tooth on the other rotor with a continuous contact at uniform speed.

In my Patent No. 2,011,388, granted August 13, 1935, was shown a fluid mechanism having rotors whose contours consisted of simple epi- and hypocycloids of even length. In cycloidal gear forms such cycloids have instant radii diminishing to zero at the pitch or ratio circle. Such curves because they are sharp just where the point of maximum driving action occurs, wear rapidly and become noisy.

By the term "instant radii" I have referred to those radii equal to chords of the rolling circle employed in drawing arcs from centers on the ratio circle, the envelope of which arcs is the cycloid. Such instant radii extend from a pitch or ratio circle distances from zero up to the maximum diameter of the rolling circle and back to zero, there being an infinite number theoretically for each cycloid.

These instant radii are not to be confused with the radii of cycloids used in mathematical formulae but not used in actually drawing cycloids, nor are they to be confused with "instantaneous centers" at the intersection of lines perpendicular to direction of motion.

Involute curves engage between two convex surfaces at points away from the center line at full mesh where there is greater radial slip and where contacts tend to cut thru lubricants and to concentrate loads on small areas. Such curves cause rapid wear and cause failure of contact at uniform speed, which means noise.

This invention is an improvement over all such contours particularly in their driving areas.

In my other earlier Patents Nos. 1,682,563-4-5 it was pointed out that a center of curvature of a circular master form representing a tooth crown curve of the inner rotor must be located on an extended radius of the ratio circle that carries it at a distance outside of the ratio circle depending on the tooth curvature. This applied to the "hypo" system of generation. In the "epi" system also a circular curve of a given radius requires that its center lie outside of its ratio circle at least a certain minimum distance, the distance having been referred to as the "curtate addition". I find the term "circroidal addition" more comprehensive and precise. It applies to both internal and external gearing. Other curves than circles (except cycloids) require other corresponding minimum circroidal additions.

The greater the radius of curvature of a circular tooth driving curve, the greater the circroidal addition, other conditions being the same.

In this patent as applied to the "epi" system of generation the circroidal addition is essential to the production of close fitting operative curves maintaining continuous contact at uniform speeds. And the circroidal addition is outside of the ratio circle, whether generation (outlining or describing contours by means of a master form at uniform speeds) is accomplished by rolling one ratio circle inside or outside of the other, that is whether a pinion tooth outlines the outer rotor contour, or an outer rotor to the outlines a pinion contour.

The tooth contours of rotors prior to my invention in rotors have been made without knowledge of the principle involved in the circroidal addition. That principle not being observed, the rotor teeth of well designed rotors fitted together in one position, would prevent rotation by jamming against each other. When such tooth curves were cut away to permit rotation, a practise resorted to in the prior art to make inoperative rotor curves work, irregular tooth speeds resulted, with clashing, noise, and low volumetric efficiency. Their mechanical and geometric resources being exhausted, further effort ceased.

My present invention comprises among other items, a specific form of rotor or gear contour in which the teeth have curves based upon a trochoid generated by a point carried by one pitch or ratio circle as it rolls on the other pitch or ratio circle and outside of it.

The use of the terms "cycloid" and "trochoid" in this case are intended to have different meanings. Some authors and dictionaries confuse them. The gear art at one time employed curves traced by points on circles rolling upon straight lines or on or in other circles, and these curves were generally known as cycloids, not trochoids. Therefore the term "cycloid" in this case refers to curves thus well known. The term "trochoid" as used herein is limited to curves traced by points not on circles but carried inside or outside of them as they roll on other circles, or on a straight line.

As the geometry upon which my invention is based is novel, new names may help to define its factors.

The term "circroid" is applied to that class of unlooped trochoids outlined by points carried by pitch or ratio circles rolling within or outside of other pitch or ratio circles. There are hypocircroids and epicircroids.

An "epicroid" is a curve alongside of a circroid such as an envelope, developed by a master form fixed to the extended radius of a rolling circle some point of which travels along a circroid to provide mating tooth curves. An epicroid is not necessarily equidistant thruout from a circroid.

A "phypocroid" is a curve outlined by a circular form whose center follows a hypocircroid, the first "p" indicating "parallel to" or "equidistant from".

A "prepicroid" is an envelope parallel to or equidistant from a circroid, such as that developed by a circle whose center follows a circroid, the letters "pr" suggesting "parallel".

In Fig. I the curve 12 is an epicircroid, the curve 3 an epicroid, and being equidistant from 12, also a "prepicroid". In Fig. IX the curve 36 is an epicircroid, and the curve 33 is a prepicroid. If the master form 9a, Fig. IX, was irregular, the curve generated by it would be merely an epicroid.

It is thus seen that this invention relates to certain species of trochoidal curves outlined by points moving with ratio circles as they roll with relation to other ratio circles, and that it involves pairs of curves, mainly of the epi system, in novel meted combinations.

In the drawings:

Fig. I illustrates one form of my rotors.

Fig. II shows a section of Fig. I on line II—II.

Fig. III shows a rotatable milling cutter used as a master form in generating contours based on circles.

Fig. IV shows another form of tool, itself not rotatable (not not a cycloid) which may be used as a master form with which to generate a complete rotor or tooth contour.

Figs. V and VI show other forms of non-rotatable tools, for use with teeth of the relative proportions indicated in Fig. I, these tools being provided with curves such as are generated by the master form on the inner rotor, which are capable of generating the outer rotor curve.

Fig. VII shows a modification of the same type of contours in which the teeth of the outer rotor have greater angular length that is, greater thickness in a circular direction and in which the generated tooth spaces are for some purposes unimportant, so long as they permit rotation.

Fig. VIII shows an enlarged view of a tooth curve of the inner rotor.

Fig. IX illustrates the geometrical relations upon which my rotors may be based.

In Fig. I are shown two rotors, the inner rotor on the axis 4 having tooth crowns 2 and tooth spaces 3; and the outer rotor 5 having tooth crowns 6 and spaces 7, centered upon the axis 8. The teeth of these rotors make continuous travelling contact with the contours opposed to them during relative rotation at uniform angular speeds determined by their ratio of teeth. These speeds are proportional to their pitch or ratio circles A and B, as they roll in contact with each other with one outside of the other and without slip at the point of contact.

It will be noted that the pitch circles of these particular rotors lie well inside of the actual tooth diameter of the pinion. The crowns of the teeth of the outer rotor correspond to the radius of curvature of the master circle.

The master circle used for the generation of the rotors in Fig. I may be in the form of a circular milling cutter 9 (Fig. III) shown in generating positions for generating the inner rotor 1 at 10 and 11. As the cutter generates the curve 2, 3, of rotor 1 its axis follows the epicircroid 12. Particularly when the teeth are proportioned somewhat as in Fig. I, the master tool may also, in a similar manner, generate a tool form making a contour in the manner of a rotor blank like that shown in Figs. IV, V, VI, the contours of which may be used as a mating tool swinging around the center 4 of the inner pitch circle and carried with it during rotation, cutting the tooth crowns and spaces 6, 7 of the outer rotor directly in the outer rotor blank. Such tooth crowns are the same in curvature as the master circle.

If the curves are fairly exact and the outer rotor drives the inner rotor clockwise the teeth of the rotors may engage each other at 15, 16, 17, 18, and near 19 (the last contact just opening) at first perhaps with pressure relations everywhere noted; but after being burnished and ready for service with pressure only in the driving range represented by the double headed arrow. Elsewhere the contacts are without pressure; and friction and heat cease yet sufficient contact to maintain a polish may persist. The other tops, sides, and spaces of the teeth as indicated in broken lines at 2a and 6a may, if desired, be cut away. Metal projecting from my contours would block rotation. But metal may be cut away from my curves to an extent not needed for driving or pressure functions.

The bottoms of the tooth spaces 3a and 7a may also be undercut provided the driving surfaces of the sides of the spaces are not seriously depleted.

Undercuts 3a and 7a in Fig. I, and 26 and 27 in Fig. VII are of advantage in high speed rotors to prevent the buzz resulting from the tops of the teeth of one rotor hitting the bottoms of the tooth spaces of the other rotor at full mesh. A thousandth of an inch more is enough for this purpose. It is understood that a lubricant or other liquid between the teeth may at times prevent actual metal to metal contact more effectively than between the usual two convex contacts.

When the master form 9 is circular the contour 2 and 3 is equidistant from the circroid 12.

The rotor curves in Fig. VII present advantages over those in Fig. I. The outer rotor teeth and the inner rotor tooth spaces have greater angular length than the inner rotor teeth and outer rotor tooth spaces. It will be noted that the contours are intersected by the pitch or ratio circles A1 and B1 of the two rotors centered at *a*1 and *b*1 respectively, as they are based upon circroids external to them.

The master milling cutter is illustrated at 20 in the position of the tooth 21 of the outer rotor 22, the latter being centered on the axis *b*1. The tooth spaces of this rotor are narrow as shown at 23. The inner rotor is generated by this milling cutter. It is carried by the pitch circle B1, while a blank carried by the pitch circle A1 has contours generated on it as before providing teeth 24 and tooth spaces 25. In this case the teeth of the outer rotor have greater angular length, that is, greater thickness in a circular direction, and generation of tooth spaces is sometimes unimportant, except to determine theoretical spaces.

The teeth, having greater angular length, have greater radii of curvature and greater length of wearing surface, so that with respect to the short convex curves of the pinion teeth and their sharper curves—particularly at their "corners"—they predominate in wear. Since the circroidal addition is usually the least dimension for such teeth, any wear increasing their radii of curvature, would cause the constant contact relation to be lost. By providing that wear occurs mainly on the pinion tooth curves, the constant contact relation lasts longer—generally indefinitely.

It will be noted that the radial slide of a tooth 24 into a tooth space 23 in the driving range indicated by the double headed arrow, is not much different from that in Fig. I, yet the driving range in Fig. VIII extends further across full mesh making possible larger capacity with a smaller number of teeth and greater eccentricity for the same diameter of rotor curves. This increases the displacement of the gear chambers with relation to the durability of the driving curves, cutting the cost of the mechanism desired for a particular pump.

After rotors or gears have been rough machined they may be "run in", that is, operated under service conditions until the rough surfaces have been polished off, and the pressure outside of the driving range due to tightness of fit has been mostly eliminated. In the form shown in Fig. I the surfaces of the two rotors subject to this action are about equal, and the burnishing takes place on the curves of both about equally. Considerable time was once spent on a compressor having such rotors in order to get it free enough to run properly.

In the form shown in Fig. VII the outer rotor teeth are preferably broached so as to acquire a smooth polished surface, and only the crowns and the corners of the teeth of the inner rotor have to be burnished, that is, abraded and polished, to provide the pressureless slide peculiar to these rotors. With the narrow teeth in Fig. VII the burnishing action is accomplished in a few minutes and the master form curves of the teeth of the outer rotor predominant in size, are not affected. Thus the master curve and its circroidal addition are not altered, so that the curves of the inner rotor are worn generatively. The tooth form of the rotor in Fig. VIII is enlarged. The corners 28 and 29 for broaching purposes may be a curve of small minimum radius, perhaps a thirty second of an inch or even less.

This curve of the pinion is determined by the circroidal addition, the distance from Z to Y in Fig. IX. The greater the circroidal addition (*a*1), other factors remaining constant, the larger is the curve at the corners 28 and 29. The top of the tooth 30 is comparatively flattened, having a large maximum radius of curvature admirably cooperating with the curve of the teeth of the outer rotor at open mesh, as illustrated at 31, Fig. IX, in broken lines, to maintain tightness between high and low pressure ports in a pump or motor, such as is particularly needed in high pressure gas mechanisms.

These tooth relations are interesting from another angle. In Fig. I, if the contours are reduced in diameter to the shapes shown in Fig. VII (using the same master tool 9) the contours may be intersected by the pitch circles A and B. In other words the rotors have smaller contour diameters and hence smaller capacity. The capacity however may be restored by increasing the numbers of teeth of the rotors until the diameters in Fig. I are restored. This will increase the numbers of teeth and the numbers of rotor chambers over those shown in Fig. I. In air compressors (with the outer driving the inner rotor) rotor chambers are separated from each other by tooth contacts on the closing side; and with a larger number of rotor chambers between atmospheric pressure and the discharge port, the difference in pressure of the gas in the successive chambers is less with less tendency to leak over the sides of the rotors (usually checked by a liquid film of some kind). If the eccentricity, the distance from *a*2 to *b*2, is increased, thereby deepening rotor chambers and so enlarging their capacity, the circroidal addition requirement, of course must be observed. Rotor contours of the form shown in Fig. VII with the variations above noted, may be superior in many ways to those shown in Fig. I. It will, of course, be understood that the same curves may be produced by using a master form having the shape and size of a tooth of the inner rotor, and generating the outer rotor with it, thereby producing the contours described in the outer rotor, and then using a tooth form of the outer rotor with which to generate the inner rotor contour. After finding the contour of the crown of the inner tooth, this is merely reversing the process.

When starting to generate rotor curves on a blank, the mill 9 may be located on the center line thru the axes, though other starting positions are possible. If it is started as at the bottom of Fig. I it is fed vertically toward the axes until it touches the point 31 of the top of a prospective tooth. When it has reached its correct position generation may start. If it is located at the top of a blank at Z', Fig. I, it is fed vertically downward into the blank until it reaches the bottom of a prospective tooth space. Of course rough preliminary generation on larger diameters is possible and often advisable, the contours being cut by stages to the sizes desired.

I find gray cast iron to be admirable for my rotors since in service it acquires a glaze that is hard and durable. Any other metal or material however may be used to provide the service desired.

As to numbers of teeth, under otherwise equal conditions the fewer the teeth the greater the abrasion or wearing effect in the driving range and the more quickly rotors deteriorate in ordinary service. I have found rotors having a five to six ratio about two inches in diameter, very serviceable in handling fuel oil at low pressures; and a six to seven ratio, four inches in diameter, wonderfully durable with gasolene at low pressures; both running at motor speeds of 1725 R. P. M. or the like. A ten to eleven ratio in small size rotors, two and a half inches in diameter for example, has been found practically indestructible at these speeds in fuel oil and at hundreds of pounds pressure. A seven to eight ratio in an air compressor having a displacement of 50 cubic feet per minute at the same speed provides a durable construction for fluid pressures up to 150 lbs.

The greater the number of teeth, diameters being equal, the less the capacity, and the greater the durability. The area of the rotor chambers increases with either the eccentricity or the diameter.

In the generating machine in the patent of Hugo Bilgram and myself, No. 1,798,059, the method of operation established by the gearing produces phypocroid contours as described above. The contours in this present invention are termed prepicroids and may be produced by the machine in Patent No. 1,798,059 by changing the gearing between the worm shafts so that they turn in opposite directions to each other. This is accomplished by removing the gears 38, 44, and 40 in Fig. 2 of that patent and substituting two gears meshed directly together. These substitute gears have the same relative pitches, as 38 and 40, and being mounted on and keyed to the shafts 37 and 39 of the worms, the shafts are rotated at the same relative speeds but in opposite directions to each other. Instead of a blank for the outer rotor being carried by the shaft 23, a blank for the inner rotor is substituted, the milling cutter 12 (corresponding to the cutter 9 in this case) is fed radially inward until the right diameter for the desired tooth form is reached.

Without limiting my invention to any specific numbers of teeth, master tool, and size, the following relative dimensions have been used with good results. They apply to the rotors in Fig. VII. The distance between the centers of the two rotor pitch circles is 3 when the outside diameter of the inner rotor is 44, and the master circle diameter is 26. The unit of measurement may be centimeters or inches or any other unit. In Fig. VII the unit is intended to be a sixteenth of an inch. In such rotors the radial depth of a rotor chamber when full open is 12.

This does not mean that the master circle, the eccentricity, and the circroidal addition may be changed at will, as noted below.

The capacity of a pair of rotors is approximately the product of the thickness times the area of an annulus between two circles, one touching the crests of the teeth of that rotor which is attached to the driving shaft, and the other touching the generated bottoms of the tooth spaces of the same rotor.

The geometry of my invention is illustrated more clearly in Fig. IX.

My rotor contours may have geometrical outlines produced by three elements, namely rolling pitch or ratio circles which may be A2 and B2, and a master form 9*a* located or fixed upon the radius (extended) *x* with its center at Z; this radius in this figure being also the center line thru the axes *a*2, *b*2, of the ratio circles. These elements are sometimes assisted by a fourth derivative element, a mating curve D such as the convex tooth top of a rotor contour generated by the said master curve, employed to generate an outer space curve.

Let these two ratio circles be located upon a plane, one outside of the other and tangent to it. Let their diameters be in proportion to the numbers of tooth divisions selected for the two rotors which in their preferred form differ by one. The master curve 9*a* to represent the desired tooth of the outer rotor is selected to start the curve generation with, and preferably located upon the radius of the pitch circle A2 of the rotor which it represents the tooth of.

One pitch or ratio circle carrying the master form is rolled with relation to the other ratio circle without slip at the point of tangency producing uniform angular motion of one with relation to the other, that is, of A2 to B2. This steady angular motion is determined by the relative diameters of the two ratio circles which are proportioned to the numbers of teeth of the two rotors. The master form, carried upon the radius of the outer circle A2, may be traced with relation to the inner circle B2 in each successive relative position that it assumes, thus producing a series of overlapping curves, as illustrated at E. The contour 32, 33, is a curve drawn along the crests of these overlapping outlines, a curve of envelopment, which is the tooth and space contour of the inner rotor. If the centers of curvature do not lie sufficiently outside of the ratio circle which of course refers to the circroidal addition) efforts to generate curves will result in the undercuts on the driving surfaces of the gears and on the fluid pressure holding surfaces of the rotors. If the circroidal addition is too small for the other factors the contours of the pinion are undercut where the teeth do the driving and where they should provide pressure holding engagements, and then the rotors are noisy and leak. The actual or best circroidal addition may be determined as heretofore described. A portion of this contour, as illustrated at F, preferably the convex portion of the tooth of the inner rotor, may then be carried upon the extended radius F1 of the ratio circle B2 centered at *b*2, and the rolling action continued in the same way. Its form is thus outlined in each successive position which it assumes with relation to circle A2 as illustrated at G and a curve of envelopment drawn along the crests of the outlined curves. This curve of envelopment is the theoretical tooth and space contour 34, 35 of the outer rotor.

Instead of a complete master circle 9*a*, a portion of it may be used; or any other master form 47 fixed to the radius to generate with.

The distance of the center Z of the master curve to the pitch circle A2 that carries it, is termed the circroidal addition. The circroidal path 36 followed by the center Z during the aforesaid generation is a species of trochoid, or a series of them, one for each tooth division. By locating a center of the master form further out on the radius *x* as at 37 for example so that it travels along the circroid 37*a*, the contour described is enlarged and the curve widened out as illustrated at 38. Rotors or gears having such contours would cooperate the same as before except that the angle of driving contact in the driving range would be inferior. And rotors so generated would have smaller capacity than necessary for their size and weight. Therefore for the most economical results a smaller circroidal addition should be used that does not undercut the curves, due attention being given for smaller sizes to curves that make broaching practical or easy.

In Figure IX, if both ratio circles roll together, the inner circle rolls seven times while the outer rotor rolls six times.

When the outer rotor is made as described, and if the generating mechanism should lack rigidity, or has loose bearings, slight variations in the tooth curves of the rotors or gears may occur.

If the teeth of one are a thousandth of an inch wider than the tooth spaces of the other, they would have to be driven together and rotated by force. Such minor variations may be compensated for by making the curves loose angularly, that is by providing "backlash" between them. One way by which this may be accomplished is by forming both rotor or gear curves as described above and then side stepping, or angularly turning, the generated rotor a few thousandths more or less and regenerating the contours. When the inner rotor is so treated the mill describes a curve illustrated at 41, 42. The portion 41 is in the air, no metal being removed; but the portion 42 is the result of removing metal, so that the original curve is shifted angularly around the center b2 to this broken line position. To accomplish this result the pinion that drives the gear on the worm shaft 39 of the Bilgram Hill generator after loosening the gear 40 that it carries, has been shifted with relation to the gear 3½ turns and the gear refastened to the shaft. Either side of the teeth may then be employed in the driving action according to the direction of rotation and drive. Such rotors fit freely together and burnishing takes place in service.

The very middle of the tooth might momentarily break contact slightly with the opposing rotor tooth in the position at 31 in Fig. IX. If this parted contact in fluid mechanisms permits leakage in fluid operations, ports, may if desired, be correspondingly modified to prevent it. Rotors so made prevent small particles of foreign matter from wedging between the teeth. Leakage at open mesh for a few degrees at motor speeds is not discoverable.

I find the broaching method a most convenient one for manufacture of rotors. The contour of the outer rotor is formed on a stool steel blank which is then operated as a broach with which to broach the outer rotor. The blank should be prevented from stretching during the broaching operation.

The inner rotor too may be broached, by cutting or generating the contour of the inner rotor on tool steel broaching blanks, trimming them to a burnished rotor curve, and employing them as master broaches with which to broach hollow dies assembled as a hollow broach with which to broach the inner rotor.

In order to manufacture rotors or gears that may be too large for practicable broaching operations, a tool may have a curve representing in reverse, the contour of a single tooth division of the outer rotor. Preferably the curves would be arranged like that in Fig. VI and corresponding in form to the correct rotor curve. Such a tool may be mounted in a vertical indexing gear shaper and indexed around for the operation of cutting the successive tooth divisions in the outer rotor blank as in gear manufacture. After machining a rotor or gear, the tool for the outer rotor may, if desired, be shifted to a slight degree angularly around the center of the rotor to "side step" the rotor curve as indicated at 43 and 44 and thus cut the tooth curves on one side back to the location illustrated at 43. The curve 44 is then the one that is in the air, and the curve 43 is the one left by the removal of metal.

In my Patent No. 1,682,563, among the various curves described were three specific pairs of curves, one in which the convex tooth curve of the inner rotor conformed to a circle and other contours generated therefrom; another in which the convex tooth form of either was a form of varying radius of curvature, and other contours generated therefrom; and the third, in which the convex tooth form of the outer rotor has the circular characteristic. The first was claimed specifically in that patent; the cycloid in my Patent 2,011,388; and the others including the prepicroid in this patent.

One great advantage of the prepicroid system over earlier patented forms is that the tooth driving range, when the middle portions of a tooth curve of the outer rotor and of the space curve of the inner rotor mesh, extends across the center line at the full mesh point as indicated by the double headed arrows in Figs. I and VII, reducing the radial slide and friction (as illustrated particularly in Fig. VII) between the teeth during driving. Also the quick wearing sharp convex curves of cycloids engaged in the driving range are avoided. This makes possible fewer teeth, greater eccentricity and larger capacity, in rotors having the same outside diameter as noted. The action in the driving range is nearer to a pure roll of the convex teeth of one rotor on the concave teeth of the other.

In most ratios the convex side of the teeth of the master rotor or gear engage the concave generated sides of the teeth of the mated rotor or gear across the driving range, the length from one tooth contact to the next one, in the full mesh region, presenting a driving and rolling action between them, entraining a lubricant which may distribute pressure between teeth over a wider area than is possible with convex gear teeth. The master form is generally convex, and the mated form generally concave. While the concave sides of the mated gear or rotor, under certain relations and sizes of parts, may begin with circular portions near the middle of the tooth space, they nevertheless may have changing radii first increasing in length and then preferably merging into convex forms for the tops of the teeth, these tops also having curvature of varying radii; the variations with some relative sizes of teeth sometimes being slight.

This relation is characteristic of the "epi" system of tooth generation, in which the ratio circle that carries the generating form is located outside of the ratio circle of the rotor being generated. A ratio circle either surrounding or alongside of the ratio circle of the other rotor is "outside." After the tooth form has been generated on the mating rotor, it may be employed to generate the original master rotor curves whose tooth forms were adopted in the first place to start generation with. In my Patent 1,682,563, granted August 28, 1928, the system of "hypo" generation was specifically claimed, in which the ratio circle of the inner rotor carried a circular master form which was employed to generate a mated curve upon the inside of the outer rotor, the ratio circle of the inner rotor rolling around in the ratio circle of the outer rotor. The relations were such that about half the height of a tooth of the inner rotor, the outside half, was circular, while the tooth space, including the inner half of the height of the tooth of the inner rotor had a curvature of varying radii. That crown and space curve is hereby disclaimed in this case. Some of the results of this invention however may be attained by reducing the size of the master circle in that patent, perhaps a quarter or a fifth of the diameter of that shown, varying the circroidal addition to suit, and then generating the curve of the outer rotor. With enough teeth a relation is arrived at in which all the driving relation at full mesh becomes that of a convex curve of one rotor against a concave tooth of the other rotor, which is a feature of this invention.

The hypo system of curves is automatically limited to internal gears of rotors while the epi system is not so limited.

I have sometimes referred to my preferable rotor contours as "circular." Contours may be generated by master forms of many shapes, and the "circular" contours are those generated by a circular master form. In such case the curves 34, teeth of the outer rotor, are arcs of circles, and the curves 32 and 33 may be generated thereby. The curves 33 are not exactly circles, since the center Z of the circular master form 9a which generates them follows the epicircroid 36 and in so doing travels around on the cusps between the loops. The cusps of trochoids however vary from something more than a point to curves of considerable radius.

It has been explained that the point Z (Fig. IX) should be outside of the pitch circle A2 a sufficient distance to prevent undercutting the curve 33. (With circular master forms this means that lines drawn between the curve 32, 33, to the circroid 36, normal to both should not cross each other between the curves, and that the curves 32, 33 and 36 are equidistant). The farther away from A2 that the point Z lies, the flatter the cusps, and the more angular motion the point Z makes while rounding the cusp, and the farther away from a circular form the curve 33 becomes as it is being generated by the circle 9a. Another disadvantage of large cusps is increased diameters. As the tooth curves lie ever farther from the ratio circles, they have to rub and slide to constantly increasing amounts. The driving angle between teeth in the driving range becomes less and less easy, and if carried far enough would jam. Hence the smaller cusps and corresponding inner rotor space contours are superior for service conditions. The nearer the point Z is to A2, the nearer the cusp approaches a point, in which case the space curves 33 approach a somewhat circular shape.

In my teeth the bases preferably are wider and the tops narrower so that the angles of pressure, which tend to break involute gears, may be in my gears more strongly resisted.

One important factor of the contours specified in this case is that the driving range, which in some of my earlier inventions stopped short of the center line thru the rotor axes (at full mesh of course) now lies on both sides of the center line. Since the driving range which is always the finally effective factor as to size for a given capacity is but the length of a tooth division, this range, divided on both sides of the center line, involves less radial slide between the teeth since in this range the underlying portions of their pitch circles are closer together. In a pump the rotor chambers contain far less liquid to be discharged thru the slowly opening contacts beyond the center line, and therefore require less driving power to close the chambers at full mesh than the rotors in my earlier forms. In gearing this drive across the center line at full mesh more nearly approaches a rolling contact, capable of heavy driving power. This result is due not only to the specific circular form of the teeth of the outer rotor but also to their increased relative thickness.

In my Patent 1,682,563; and those patents having the next two higher numbers, the best driving region, the length of a tooth division, was mainly to one side of full mesh point, while in the rotors in this case, the same driving range is mainly across the full mesh point, thus eliminating much of the radial slide towards the end of the driving range in the earlier case, trapped more liquid and required more power than the contours in this case under otherwise even conditions.

I find that a one to two, and a two to three ratio are so inefficient in their driving relations that one quickly wears away any generative curve on the other in such an abnormal manner that the continuous contact engagement specified cannot be maintained. The contours of certain patents of record fail to rotate when made with precision. Modifying them to make them rotate would provide loose and irregular driving contacts. When modified in the light of my invention to approximate continuous contacts at uniform speed, they come within the scope of my invention, in which case such continuous contacts at full mesh and at open mesh are somewhat efficient in low pressure liquid pumps. In compressors failure of contacts between closing chambers permits escape of compressed gases and greatly reduces or destroys mechanical efficiency. The same is true of motors between the teeth of opening chambers.

In my Patent 1,682,563, the specific claims referred to circular teeth on the pinion, no specific claims to circular teeth on the outer rotor being made.

This application claims amongst other things, circular teeth on the annular rotor. The teeth of either rotor or gear may be so proportioned that generated curves approximate circles. In the drawings such tooth contours were drawn with a compass. Nevertheless the centers of the curves are located at such distances from the gear axes as to meet the requirements of the circroidal addition, and the curves lines are intended to represent the theoretical generated curves. In Fig. IX for example the tooth curve "F" and space curve between "32" and "F" are shaded perhaps enough to include the true generated curve. The same is true at "15" or "19" in Fig. I. Such circular curves may suffice in low pressure liquid mechanisms for many purposes. High pressure, fast rotating liquid mechanisms, motor and compressor mechanisms, without true generated curves are noisy and inefficient. With them they are quiet and efficient. Close fitting contours, with or without precision curves, will jam unless the circroidal addition is present.

The specific contours in the patents were phypocroids and based upon "hypocircroids"; and the preferred contours in this case are prepicroids based upon "epicircroids".

While I have described my invention as applied to gears for fluid pumps, I do not limit it to pumps since the same tooth curves are applicable in whole or in part to other gear and engine movements such as compressors, meters, engines, and gears generally.

While I have described tooth forms for rotors for pumps, with specific ratios for such mechanisms, I do not limit it to such ratios.

My invention greatly improves rotor mechanisms.

First, it provides a plurality of driving convex curves engaging mated curves at uniform angular speed, with a better engagement in portions of the driving range away from the center line to offset radial slip.

Second, it makes possible the location of these driving contacts nearer to, or crossing the pitch or ratio circles.

Third, it so increases the angular length of the tooth base and the arc of tooth pressure as to allow a corresponding reduction in size of tooth and diameter.

Fourth, the lines or vectors representing the angles of pressure between teeth may, if desired, pass thru the base of the teeth in each gear. The teeth of both gears are then subjected to more compression stresses than to breaking or shearing stresses, making further reduction in diameter of gears possible.

Fifth, variations in assembly and variations due to tool grinding have less effect with such curves.

These results are attained to such a degree that my teeth may run silently and smoothly at all speeds with durability heretofore unknown.

These various advantages result mainly from the employment of the epicircroidal form of trochoid as a basis for gear curve formation with a minimum radius of curvature greater than zero.

Desirable tooth curves based on trochoids may be located near or across ratio circles preferably by describing curves parallel to the trochoids or by a rolling circle rolling on the proper side of a trochoid (on the convex side of the cusp), or by other means. Trochoids described by a point carried by a ratio circle as it rolls on the other ratio circle are preferably used.

A prepicroid such as 32, 33 may be outlined by rolling a circle 46, having half the radius of the master circle 9a, around inside of the circroid 36, outlining its successive positions, such outlines forming the prepicroid 32, 33. It is evident that the smallest curvature of 36 must be not less than that of the circle 46 in order that the prepicroid may be perfect.

It is of course apparent that if an outer tooth curve 9a may generate an inner curve 32, 33, the latter curve may in reversing the process generate the outer tooth form 9a, a relation that is referred to as mutual generation.

Other methods of arriving at these same curves must observe the same geometrical relation. Where the master form is not a circle, as at 47, the same relations exist, the mating curve being designed to fit the master form in successive positions.

While I have described trochoids and circroids, and curves parallel thereto as the best means of arriving at the novel characteristics of my invention, I do not limit it to that geometrical system, since if variations of curves and describing forms may attain some or all of the novel results and even the same exact curves, they lie within its scope.

In this patent I have referred to contours of teeth generated by a master form, or outlined and described by it, or by a tooth form of the other rotor, at uniform or steady angular speed. I disclaim being the first to conceive the idea of generation, outlining or describing gear tooth curves generally, that being a common practice in the gear art. By my descriptions I refer to tooth curves conforming to the circroidal addition of such dimensions as to make possible contours that will, in fluid mechanisms, maintain fluid pressure holding engagements, and that will drive quietly at steady speed. The higher the fluid pressures and speed, the greater the precision of manufacture needed to maintain silence between the teeth.

My invention makes possible air compressors with stages of compression in successive chambers that provide compressed air with least expenditure of power, and pumps that are capable of delivering high pressure liquids with least leakage or "slip"; and pumps that at high speed are durable and quiet: not overlooking the desirability of these factors for mechanisms of which less is required.

The object of the foregoing detailed geometrical description, and the various observations relating to it, is to lay before those skilled in designing rotor or gear teeth, the elementary principles underlying this perfect rotary motion, and the means by which it may be arrived at.

In practice, in commercial manufacture, many variations will occur. When their extent is determined substantially in accord with the fundamental theory of the drive at full mesh, the driving curves of ample curvature and of the circroidal addition, they involve its novelty and lie within the scope of my invention.

While I have described trochoids or circroids, and curves running alongside of them or parallel to them, as the best means of arriving at the novel features of my invention, it is of course evident, that contours having the same characteristics may be arrived at by different geometrical means. So long as such contours observe the features herein set forth or claimed, they lie within its scope. Variations, even those sacrificing precision in contact relations for less exacting purposes, lie within its scope.

What I claim is:

1. A rotary mechanical movement comprising two toothed rotor members having internal and external teeth respectively, one member within and eccentric to the other, forming chambers between them and having driving contours characterized by curves on one rotor described or outlined by the teeth of the other at relatively steady or uniform angular speeds, said driving contours maintaining continuous travelling contacts in the full mesh region between the opening and closing chambers, and travelling engagements in the open mesh region, said outer rotor driving contours being circular convex arcs with the centers of said arcs travelling outside of the ratio circle of the other rotor a distance sufficient for said contacts and engagements.

2. A rotary mechanical movement comprising two toothed rotor members having internal and external teeth respectively, one member within and eccentric to the other, forming chambers between them and having driving contours characterized by curves on one rotor described or outlined by the teeth of the other at relatively steady or uniform angular speeds, said driving contours maintaining continuous travelling contacts in the full mesh region between opening and closing chambers, maintaining travelling engagements in the open mesh region, the convex curves of the outer rotor characterized by predominating wearability over the convex curves of the inner rotor whereby said curves on the inner rotor during wear are maintained in the generated form, the centers of curvature of the predominating curves of the outer rotor travelling outside of the inner ratio circle at distances sufficient for maintaining said engagements.

3. A rotary mechanical movement comprising two toothed rotor members having internal and external teeth respectively, one member within and eccentric to the other, forming chambers between them and having driving contours characterized by curves on one rotor described or outlined by the teeth of the other at relatively steady or uniform angular speed, said driving contours maintaining continuous travelling contacts across full mesh between opening and closing chambers, and travelling engagements in the open mesh region, the curves of the rotor teeth lying across the ratio circles having radii of curvature greater than zero, the inner rotor having corner curves between the convex and concave pinion curves, such corners being of relatively small radii, and located outside of the ratio circle of the pinion.

4. The combination claimed in claim 3, said rotors having a difference of one tooth division.

5. The combination claimed in claim 1 having a convex tooth surface engaging a concave tooth surface for substantially the length of a tooth division to maintain uniform speed regardless of wear.

6. In a pair of gears, a tooth curve on a first gear having a driving area such as is generated or outlined by the outside of a master form representing the form, size and relative location of the driving area of a tooth of a second gear, a point fixed with relation to the driving contour of said master form following an epicircroid traced by said point carried around the ratio circle of said first gear by the ratio circle of said second gear, as one rolls upon the other without slip, said point being located sufficiently outside of the ratio circle of the first gear to prevent undercutting in manufacture, during said generation, of said driving areas on said first gear, the convexed areas of the teeth of the first gear having varying radii of curvature as distinguished from circular arcs, and a minimum curvature across their ratio circle with a radius greater than zero as distinguished from cycloids; the driving areas of the second gear corresponding to the master form convex curve, engaging concave driving areas of the first gear at uniform angular speeds.

7. In a pair of gears, a tooth curve of a first gear generated or outlined by a convex master form representing the tooth form of the second gear, with a center of curvature of said convex master form following an epitrochoid on the ratio circle of the first gear, which epitrochoid is traced by said point while it is carried around said ratio circle of said first gear by the ratio circle of the second gear rolling without slip upon the ratio circle of the first gear, said point located sufficiently outside of the ratio circle of the first gear to prevent undercutting in making the driving portions of the teeth of the first gear, the convex crowns of the curves of said first gear having varying radii of curvature, the teeth of said two gears maintaining in their driving range continuous contact at uniform angular speeds.

8. In a gear pair, rotary toothed members, one adapted to drive the other, driving curves on said teeth members, those on one convex and those on the other concave, providing a driving range between them inside and outside of their ratio circles, one member being a master member, the other a mated member, the driving curve on said mated member having a curvature conforming to that generated by the driving curve on said master member while the ratio circle of said master member rolls upon the outside of the ratio circle of the mated member without slip, the driving curves on said master member having curvatures whose radii are centered outside of the ratio circle and so located with relation to it that said generated mated driving curves maintain continuous contact with said master driving curves at relatively uniform angular motion, the crowns of said mated driving curves having curvatures of varying radii, said master member having circular driving curves.

9. The combination claimed in claim 6, having the master form tooth curve conforming to a relatively long radius of curvature whereby said mated tooth convex curve is relatively narrow angularly.

10. In a gear pair, master convex driving tooth faces having continuous unreversed curves on one gear lying across the ratio circle of that gear with their radii of curvature ever greater than zero, partly within and partly outside said circle, engaging continuous unreversed driving tooth surfaces of the other gear conforming to concave curves outlined by said master convex driving faces at constant relative speed according to the tooth ratio of said gears, the centers of curvature of said master curves disposed at such distance ouside of the ratio circle of the gear as to prevent outlining curves having "undercuts" or curves whose driving areas are out of contact with said master faces, in the full mesh region.

11. Two meshing gears having engaging faces and flanks of forms corresponding to curves outlined by the system of generation at uniform angular speeds according to the ratio of the teeth, wherein the ratio circle of a first gear is located outside of the ratio circle of the second gear, and wherein master forms selected for faces of said first gear having their minimum driving curvatures of greater radii than zero are located with relation to the second gear so that centers of curvature of the master forms travel outside of the ratio circle of the second gear, at a sufficient distance to outline, during generation, a continuous mating curve of varying radii of curvature on the teeth of said second gear.

12. The combination claimed in claim 11 having a circular master form.

13. In a gear tooth form, a tooth surface conforming to an epicroid curve, and comprising an envelope of a master form traveling along an epicroid around the ratio circle of said gear, said epicroid being disposed outside of the ratio circle of said gear far enough to prevent undercutting of the driving portions of said gear tooth.

14. A rotary mechanical movement comprising two rotor members having internal and external teeth respectively, one member within, eccentric to, and characterized by one less tooth division than the other, the contours of the tooth divisions of each rotor characterized by curves described or outlined by the form of the teeth of the other at relatively steady or uniform angular speed, having continuous travelling contacts between the teeth between the opening and closing chambers across both the open mesh and the full mesh regions, said sliding contact curves on the teeth of the inner rotor including curves generated by approximately circular convex arcs, the teeth of the outer rotor comprising said arcs and being substantially wider than those of the inner rotor.

15. The combination claimed in claim 14 having the corners between the convex and concave curves of the inner rotor teeth of relatively slight radius.

16. In combination mating gears or rotors having a driving relation, one mated gear having master form teeth, the other mated gear having teeth with a generative relation with respect to said master form teeth, the ratio circle of said master form teeth lying outside of and tangent to the ratio circle of the mated teeth, said master form teeth having driving contours composed of circular arcs, the actual mated gear contours comprising regular and repeated variations of curvature for each tooth division and having a continuous generative relation at uniform angular speed with respect to the driving contours of said master form teeth, the centers of said circular arcs traveling outside of said mated teeth at a sufficient distance for said continuous generative relation, the spaces between said master form teeth being cut away to provide rotative clearance for the teeth of the other gear, and having the driving relation across full mesh mainly between a convex curve of one gear and the concave curve of the other gear.

17. In a pair of gears, teeth on a first gear having driving curves of varying curvature, as distinguished from circular curves, said driving curves having radii of curvature greater than zero as distinguished from the end portions of cycloids, said driving curves having a generative relation with driving curves on master teeth on a second gear, said master driving curves having radii of curvature greater than zero as distinguished from the end portion of cycloids for similar teeth, the centers of curvature of the driving curves of said master teeth following epicircroids around the ratio circle of said first gear outside of said ratio circle at a distance sufficient to prevent undercutting during generation of the driving contours on said first gear.

18. The combination claimed in claim 17 having one gear within the other.

19. The combination claimed in claim 17 having one gear within the other, and the crowns of the teeth of the outer gear circular in form.

20. The combination claimed in claim 17 having one gear within the other, and the inner gear having not less than four teeth to provide for an adequate drive relation.

21. The combination claimed in claim 17 having one gear within the other and the teeth of one gear having convex curves of greater radii than the concave tooth spaces and predominant in wearability over the teeth of the other gear.

22. The combination claimed in claim 17 having one gear within the other, and having the convex tooth curves of the outer gear of greater radii than those of the inner gear providing predominant wearability of the convex teeth of one rotor over those of the other.

23. The combination claimed in claim 3, having the convex teeth of one rotor and the concave tooth spaces of the other rotor of greater radii of curvature than the concave spaces of the one rotor and the convex teeth of the other providing predominant wearability of the convex teeth of one rotor over those of the other.

24. The combination claimed in claim 16, having the tooth spaces of lesser angular length of one of said gears cut away to provide free rotative clearance for the teeth having lesser angular length of the other gear.

25. The combination claimed in claim 16, having the tooth spaces of lesser angular length of one of said gears cut away to provide free rotative clearance of the teeth having lesser angular length of the other gear, and having the driving relation across full mesh between a convex curve on one gear and an unreversed curve on the other gear.

26. The combination claimed in claim 17, having one gear within the other and the teeth of one gear having greater angular length than the tooth spaces, said spaces cut away to provide free rotative clearance for the teeth having lesser angular length of the other gear.

27. The combination claimed in claim 16, having the tooth spaces of the gear that has master form circular teeth cut away to provide free rotative clearance for the teeth of the other gear, and having the driving relation across full mesh between a convex curve of one gear and the curve of the other gear.

28. The combination claimed in claim 16, having narrower tooth spaces on one of said gears, said spaces cut away to provide free circular clearance or backlash for narrower teeth on the other gear.

29. The combination claimed in claim 17, having narrower tooth spaces on one of said gears, said spaces cut away on one side to provide free circular clearance or backlash for teeth on the other gear, and having the driving relation across full mesh between a convex curve on one gear and an unreversed portion of a concave curve on the other gear.

30. The combination claimed in claim 17, having one gear within the other and the convex teeth of one gear of larger radius than the teeth of the other gear to maintain predominance in wear, the sides of the teeth of one gear cut away to provide free circular clearance or backlash for the teeth of the other gear.

MYRON F. HILL.